No. 821,282. PATENTED MAY 22, 1906.
C. H. COLVIN.
FLUSHING APPARATUS.
APPLICATION FILED MAY 9, 1904.
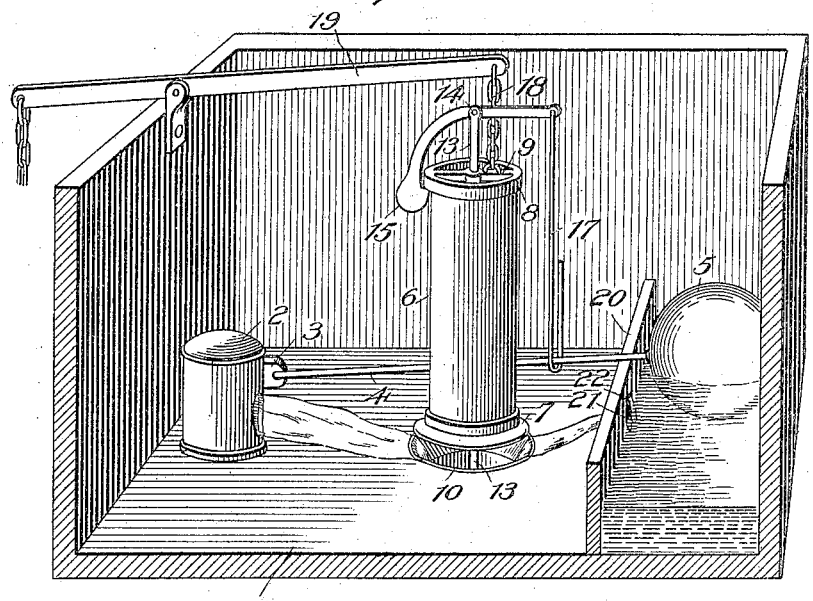
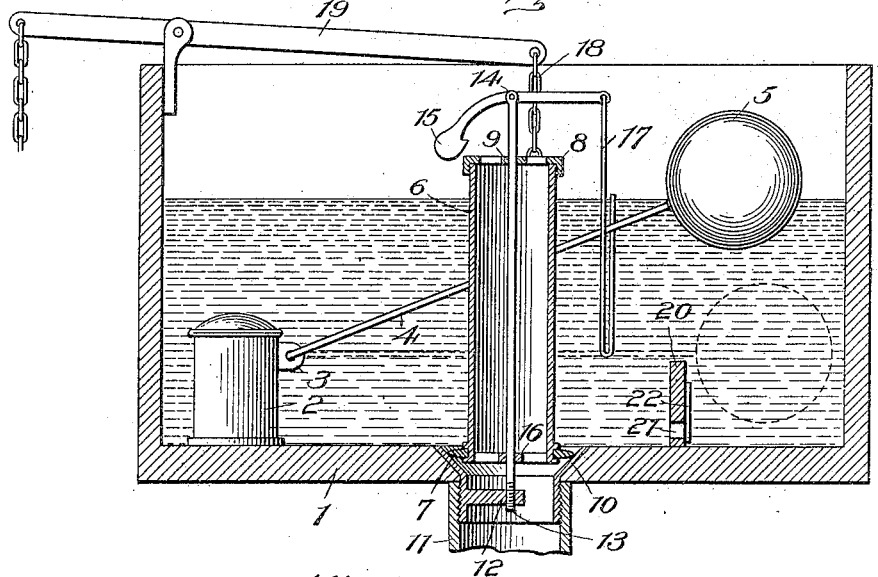
Witnesses
Edwin L. Bradford
P. H. Burch
Inventor
Charles H. Colvin
By
Robt. D. Johnston Jr.
Attorney.

UNITED STATES PATENT OFFICE.

CHARLES HENRY COLVIN, OF BIRMINGHAM, ALABAMA, ASSIGNOR TO COLVIN MANUFACTURING COMPANY, A CORPORATION OF ALABAMA.

FLUSHING APPARATUS.

No. 821,282.        Specification of Letters Patent.        Patented May 22, 1906.

Application filed May 9, 1904. Serial No. 207,155.

*To all whom it may concern:*

Be it known that I, CHARLES HENRY COLVIN, a citizen of the United States, and a resident of Birmingham, in the county of Jefferson and State of Alabama, have invented a new and useful Improvement in Flushing Apparatus, of which the following is a specification.

My invention relates to an improvement in flushing-tanks for closet-bowls and other sanitary fixtures adapted to effect and control the requisite flow of water after the tank has emptied itself to refill the bowl or retrap the fixture.

It is the object of my invention to adapt the ordinary tank-float to control and effectively regulate both the supply of water to the tank and the afterfill for the bowl by providing means independent of the level of the main body of water in the tank to retard the descent of the float toward a point where it will cause the flush-valve to fall to its seat by tripping the means which holds it open. This retarding action takes effect at an intermediate point in the descent of the float, its object being to hold the flush-valve open after the tank has emptied itself, while the water for the refill or afterwash flows from the ball-cock through the flush-pipe to the bowl.

In utilizing a single float to control both the supply and the refill it is necessary, due to the varying pressures of the water-supply, to control the action of the float without depending upon the water-level in the main body of the tank. This is because the fall of the water-level in the tank can be controlled to provide for the afterfill only by restricting the outflow of the water therefrom below a certain point, and under such conditions the action of the float will be uncertain, by reason of the fact that under certain high pressures the supply of water might equal the restricted outflow, when the float would be balanced so that it would not cause the flush-valve to be seated. It is therefore my purpose to maintain always a full and unrestricted outflow of the water from the tank proper, depending upon other means than the tank water-level to retard the descent of the float.

As a retarding means I prefer to use a comparatively shallow auxiliary reservoir in the main tank, disposed so that the float will descend into it and having a valve-controlled aperture designed to regulate the outflow of water therefrom after the main tank has emptied itself. The float will respond to the water-level in the tank in the usual manner until it rests upon the water in the reservoir, after which its continued descent will depend upon the rapidity with which the reservoir empties itself. As the float descends to a point near the bottom of the auxiliary reservoir it trips the flush-valve-supporting means, thus causing the valve to seat and the tank to refill; but in the meantime it will be evident that the flow of the water from the ball-cock after the tank has emptied itself will have a free and unobstructed escape through the flush-pipe, thus insuring the necessary refill for the bowl or fixture without interfering with the operation of the float.

My invention further comprises the details of construction and arrangement of parts hereinafter described, reference being had to the accompanying drawings, forming a part hereof, in which—

Figure 1 is a perspective view of a section of my improved tank after the main flushing action is over, showing the float resting upon the water in the auxiliary reservoir. Fig. 2 is a cross-section representing the float in different operating positions. Fig. 3 is a detail view of the valve for the auxiliary reservoir.

Similar reference-numerals refer to the same parts throughout the drawings.

Referring to the drawings which illustrate an embodiment of my invention, the tank 1 is of usual construction, being provided with a ball-cock 2, disposed near the bottom thereof and provided with integral projections 3, between which is fulcrumed the stem 4 of a float 5, which in the usual manner controls the supply of water to the tank. The overflow-tube 6 carries the flush-valve 7 at its lower end and at its upper end is screw-threaded for the reception of the cap 8, provided with suitable apertures to permit the overflow water to enter the tube and having a central transverse web 9. The valve 7 seats against the flaring upper portion of a valve-seat 10, which is preferably flush with the bottom of the tank and provided with a threaded shank projecting through a suitable opening therein. The flush-pipe 11 is screwed onto the shank of the valve-seat and by engaging the bottom of tank will force the flaring top of the seat against the bottom of the tank, suitable packing being used to prevent leakage. The seat 10 is provided with an integral inwardly-disposed projection 12, having a threaded opening. A vertical rod 13 passes downwardly through an opening in the web 9 and has a threaded end which is screwed into the opening in the projection 12. At its upper end this rod is bifurcated at 14, and a pivoted catch 15 is fulcrumed therein, its weighted end being normally disposed in the line of the ascending movement of the tube, which as it rises forces the catch outwardly until by its own gravity it slips under the projecting edge of the cap 8 to retain it in its lifted position and hold the valve 7 from its seat. I provide the tube 6 near its lower end with centering-arms 16, which slide on rod 13. A depending loop 17 is connected at its upper end to an end of catch 15, and in this loop the stem 4 of the float 5 operates, the length of the loop being sufficient to retain the stem confined within it throughout all of the operating positions of the float, it being the purpose of my invention to cause the stem when it reaches the bottom of the loop to trip the catch and release the tube 6, so that it falls by gravity and seats the flush-valve. To this point the tank may be said to operate in the usual manner, the overflow-tube 6 being lifted by a chain 18, connected to a lever 19 of ordinary construction, which is pivoted to a bracket on top of the tank. As the tube 6 and valve 7 are lifted by the lever the catch 15 will engage the cap 8 and hold the valve open until the tank has emptied itself through the pipe 11, when the float will engage the loop and trip the catch, permitting the flush-valve to seat the tank to refill. This arrangement, however, would provide for no afterfill, since the valve would be seated immediately after the flushing operation proper has ceased. To provide for this afterfill in the simplest and most serviceable manner, I provide an auxiliary reservoir in the tank, which may be placed therein or formed by a transverse partition 20, which extends across the tank and acts to retain a body of the water therein, upon which the float will descend as the tank empties itself. This auxiliary reservoir may be of any desired size and depth and construction, being provided with a restricted opening 21, by means of which the body of water in the auxiliary reservoir will escape when the water in the tank has fallen below its level. A valve 22 may be used to control the outflow of the water from the auxiliary reservoir, so that it will escape more or less slowly to secure any desired period after the contents of the tank have been discharged before the auxiliary reservoir empties itself and permits the float to descend to a position where the stem 4 will engage the loop 17 and trip the catch to permit the flush-valve to seat itself.

It will be seen that my present invention provides a retarding at a minimum expense provides a retarding means for the float which will cause any desired amount of water to flow from the ballcock into the flush-pipe 11 after the tank has emptied itself of its original body of water. This aftersupply of water acts not only to wash out the tank by its free and rapid flow into the flush-pipe, but also serves to retrap the bowl and to provide the desired afterfill. The outlet-opening from the tank is much larger than the supply-opening and is therefore adapted to carry off all the water that flows in independently of variations in the supply-pressure. Hence the water will not enter in sufficient quantities to interfere with the emptying of the auxiliary reservoir, and therefore my device will be positive and certain in its operation.

Other means may be provided which might act to retard the descent of the float at any desired point, when it would operate in the same manner as that which has been described, and I do not, therefore, desire to limit myself to the particular means shown for retarding the descent of the float, the gist of my invention consisting in the utilization of a single float to control both the water-supply to the tank, the flushing of the bowl, and the afterfill therefor without dependence upon the main body of water in the tank to regulate its several operations.

Having thus described my invention, what I claim as new, and desire to secure by Letters Patent, is—

1. The combination of a main tank, an auxiliary reservoir, an inlet-valve for the main tank, a float controlling said valve, a flush-valve, means to hold said flush-valve in its open position until tripped by said float in its descent, and means to reserve a body of water in said auxiliary reservoir for a determined time after the main tank is empty, said float being adapted to descend into said auxiliary reservoir whereby its movement toward the point where it will trip said flush-valve is retarded, the outflow of water from said auxiliary reservoir being unaffected by the water discharged into the main tank through said inlet-valve.

2. In combination, a main tank, an auxiliary reservoir, means to regulate the flow of water from said reservoir into the tank after the latter is substantially empty, a flush-valve to control the discharge of water from said tank, means to set said valve open, a float controlling the admission of water to the tank which descends into said auxiliary reservoir as the tank empties itself, said means, for setting said flush-valve open, being operated by said float to cause said flush-valve to seat when the float reaches a predetermined point in said reservoir.

3. In a flushing-tank, the combination therewith of an auxiliary reservoir an inlet-valve so disposed as not to discharge water into said reservoir after the main tank is emptied, a flush-valve, a float to control the operation of said inlet-valve and the closing of said flush-valve, said float being controlled and actuated by the water in the main tank throughout part of its operating positions, and by the water in said reservoir throughout the rest of its operating positions.

In testimony whereof I have signed this specification in the presence of two subscribing witnesses.

CHARLES HENRY COLVIN.

Witnesses:
J. MALTON SMITH,
JNO. T. GREENE.